Aug. 21, 1928.  F. SHENTON  1,681,439
FLUID REGULATING VALVE
Filed Feb. 6, 1926
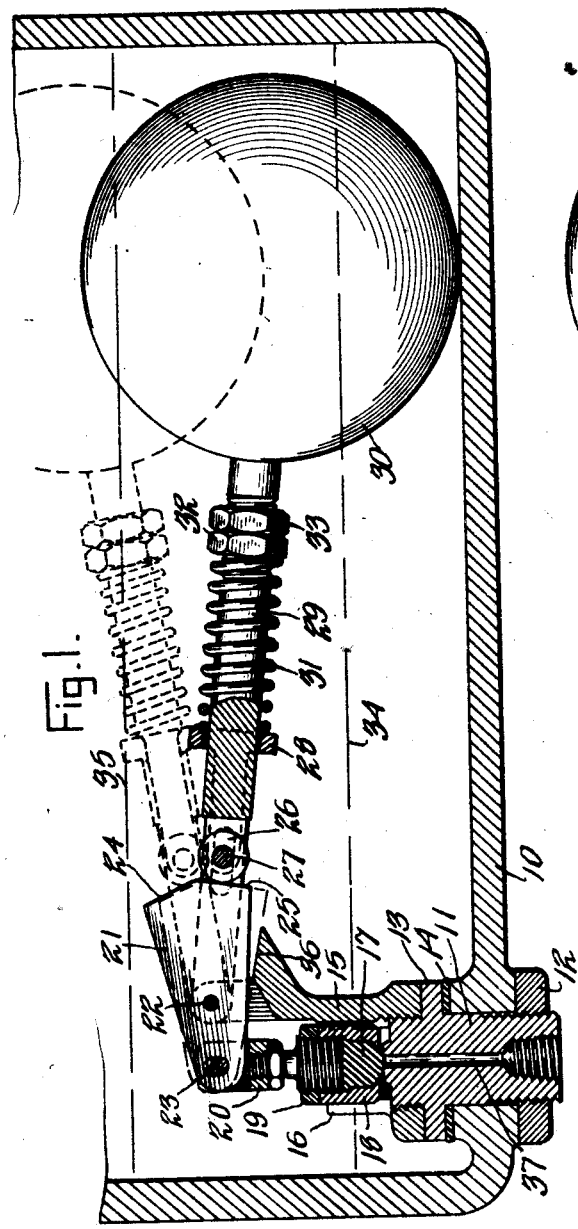
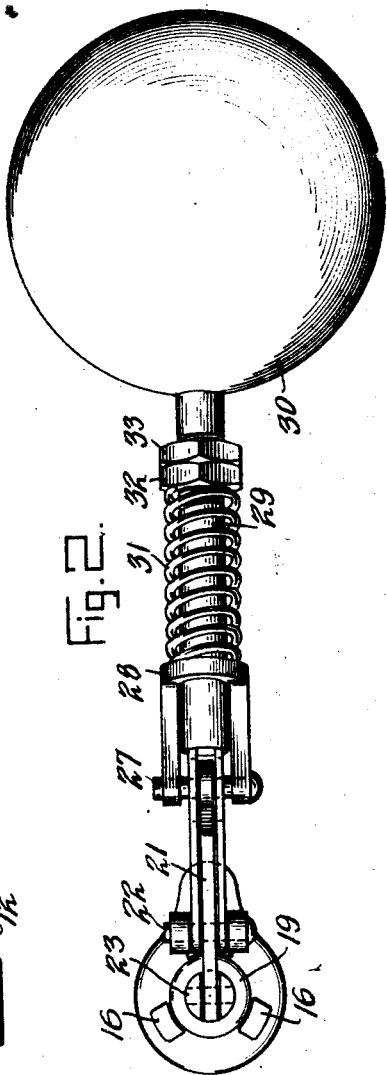
Inventor
Francis Shenton
By
Attorney Patented Aug. 21, 1928.

1,681,439

UNITED STATES PATENT OFFICE.

FRANCIS SHENTON, OF WAYNESBORO, PENNSYLVANIA, ASSIGNOR TO FRICK COMPANY, OF WAYNESBORO, PENNSYLVANIA, A CORPORATION OF PENNSYLVANIA.

FLUID-REGULATING VALVE.

Application filed February 6, 1926. Serial No. 86,556.

My invention relates to a fluid regulating valve particularly applicable for the control of the liquid refrigerant passing into the evaporator of a mechanical refrigerator but not limited in use to such a situation. One object of this mechanism is to provide a valve which will cause retention of a liquid in a tank or reservoir until a predetermined amount of liquid has accumulated therein and then will open wide to permit the liquid to pass out through a passage free from obstructions which might tend to retard the flow of liquid and cause it to expand to a gaseous state before reaching the evaporator.

Referring to the accompanying drawings which are made a part hereof and on which similar reference characters indicate similar parts, Fig. 1 is a section of a tank in which the valve is mounted, and Fig. 2, a top plan of the device of my invention.

In the drawings reference character 10 indicates a tank or reservoir for liquid having in its bottom an aperture in which the valve seat 11 is secured by means of a nut 12. The valve seat has a flange 13 bearing on a gasket 14 resting on a slightly elevated flange at the bottom of the tank and the operation of the nut 12 forces the flange 13 down on the gasket 14, compressing the gasket to insure against leakage. The valve body 15 has threaded engagement with the upper end of the valve seat and may bear against the upper face of the flange 13. The valve body has a series of guides 16 by means of which a valve button is guided into place on the valve seat. This valve button may comprise inner and outer parts 17 and 18, as indicated in the drawing with a lock nut 19 holding them together or it may be made of any other desirable form. The valve button is connected by an adjustable valve stem 20 to a cam 21 pivoted at 22, a pivot pin 23 serving to attach the valve stem to the cam.

At its forward side the cam is provided with opposite inclined converging faces 24 and 25 for engagement by a roller 26 carried by a pin 27 mounted in oppositely located arms of a yoke 28 which is slidable on the float lever arm 29 which carries a float 30 for governing the position of the valve according to the depth of liquid in the tank.

A coiled spring 31 is positioned about the float lever arm and a nut 32 is threaded on the arm for adjusting the pressure of the spring against the end of the yoke. A lock-nut 33 serves to secure the nut 32 in adjusted position.

In the operation of my device the liquid may fall as low as the line 34 and may rise as high as the line 35. As the level moves from 34 toward 35 the float will be lifted and the roller 26 will ride upward along the cam incline 25, it being understood that the float lever arm is pivoted at 22 as is the cam 21. As the roller rides up the cam face the compression of the spring 31 increases and the spring action resolves itself into a force which holds the valve firmly and with increasing force down upon the valve seat. This condition persists until the roller 26 passes the point of intersection of the cam faces 24 and 25 when the force of the spring will immediately change its action and tend to lift the valve by downward pressure on the righthand lever arm of the cam, downward movement of such lever arm being limited by a ledge 36 on the valve body 15. This pressure will lift the valve quickly off its seat and open wide the passage 37 leading to the evaporator. Thereupon the liquid will flow out quickly and the level will drop lowering the float from the position shown in dotted lines to the position shown in full lines, the liquid level lowering until it reaches the position indicated by line 34. As the float and its arm move downward the roller 26 will move from the position indicated in dotted lines in Figure 1 down along the cam face 24, the spring all the time holding the valve wide open. When the roller now passes the point of the cam the force of the spring will suddenly be reversed and transmitted to the valve in a direction for closing said valve whereupon the passage 37 will be closed quickly and rigidly. The movement of the roller along the float lever arm is provided for by means of a slot in the arm through which the pin 27 passes.

Among the advantages of my device it may be noted that the fluid level never drops below the line 34 thus providing a liquid seal for the valve. The rapid flow of the liquid through the valve when the same is open washes the valve seat and insures that the same will be free from obstructions, thus permitting the valve to close quickly and fully. The arrangement whereby the valve action is made such as to open the valve quickly and close it quickly is highly desirable in the location indicated and in many other locations.

By reason of the arrangement above described the valve will be closed throughout the greater part of the time. This permits any sediment to accumulate in the bottom of the tank where it will remain trapped and can be removed at a proper time instead of being carried into the evaporator, it being understood that the liquid in the tank is approximately stagnant so as to facilitate settling of any foreign substance.

The mechanism of the valve may be quickly removed or replaced as for a repair or a renewal, it being only necessary to take off the nut 12 when the entire construction can be lifted out of its place in the tank.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. The combination of a receptacle having an outlet passage, a valve for closing said passage, and cam means acting on said valve to hold it closed with increasing force as the liquid rises in the receptacle to a predetermined level and then to open the valve suddenly to permit the liquid to be discharged, substantially as set forth.

2. The combination of a tank having an outlet passage, a valve for closing said outlet passage, a lever for opening and closing said valve, a pivoted float, and an element carried by said float and resiliently engaging said lever for closing the valve with increasing force as the float is elevated to a predetermined degree and then opening the valve with a snap action, substantially as set forth.

3. The combination of a tank having an outlet passage, a valve for closing said passage, an operating element for opening and closing said valve, and having oppositely inclined converging faces, a pivoted float, a resiliently mounted element on the float bearing against the oppositely inclined faces of the operating element for forcing said resilient element against said faces in alternation, substantially as set forth.

4. The combination of a tank having an outlet passage, a support adjacent said outlet passage, a lever pivoted on said support and having a float adjacent its outer end, a roller slidably mounted on said lever, spring means for forcing said roller longitudinally of the lever, means for varying the tension of said spring means, a valve for closing said outlet passage, a valve operating element pivoted on said support and having oppositely inclined converging faces for engagement by said roller whereby when the float is in one position and is moved toward the opposite position the valve will be held open or closed with an increasing degree of force, substantially as set forth.

5. The combination of a support, a lever pivoted to said support, a float on said lever, an operating element pivoted on said support and having oppositely inclined faces, a spring pressed element associated with said lever for cooperation with the inclined faces of the operating element whereby when the float is in its lowermost position and the spring pressed element is engaging the lower inclined surface of the operating member the elevation of the float will cause the spring pressed element to ride upwardly of the lower inclined face and over onto the upper inclined face and move the operating element to a different position, substantially as set forth.

In witness whereof, I have hereunto set my hand at Waynesboro, Pennsylvania, this 30th day of January, A. D. nineteen hundred and twenty-six.

FRANCIS SHENTON.